March 22, 1960 H. HURVITZ 2,929,989

INTERMODULATION DISTORTION METER

Filed Aug. 8, 1957

INVENTOR

HYMAN HURVITZ

BY

Hurvitz & Rose

Atty's 2,929,989
Patented Mar. 22, 1960

2,929,989

INTERMODULATION DISTORTION METER

Hyman Hurvitz, Washington, D.C.

Application August 8, 1957, Serial No. 677,101
8 Claims. (Cl. 324—57)

The present invention relates generally to systems for measuring intermodulation distortion and more particularly to systems for testing wide band audio amplifiers to determine and measure the presence and magnitude of intermodulation distortion in the output thereof, and for measuring intermodulation distortion over a wide range of input frequency combinations to an amplifier, and for plotting the intermodulation distortion generated by an amplifier continuously over a frequency band, as a function of frequency.

Briefly describing the present invention, it is well-known that audio amplifiers generate intermodulation components, which are extremely undesirable since they represent lack of fidelity in reproduced music. High fidelity amplifiers as presently constructed and sold have intermodulation components of the order of 1% or less at full output of the amplifier, and of the order of ½% at reduced output. Intermodulation distortion is normally measured in terms of percentage of output signal at some specified output. Systems for measurement of the intermodulation distortion of amplifiers is a practical necessity in the design and adjustment of wide band or high fidelity audio amplifiers, since the extent of such components represents a primary quality factor in such devices. The measurement of intermodulation distortion is rendered difficult by the fact that it is normally a small quantity in terms of the output of an amplifier. For example, if we may consider that a 50 watt amplifier is being tested, the intermodulation distortion is part of the total output of the amplifier, about 50 watts, and has a magnitude of the order of only ½ watt, in the specified case. It is necessary in systems for measuring intermodulation distortion to isolate the intermodulation distortion from the high amplitude output of the amplifier which does not represent intermodulation distortion. It is therefore usual in such devices to insert two fixed frequencies, for example, 60 c.p.s. and 1000 c.p.s. If the amplifier is completely lacking in intermodulation distortion, the output of the amplifier will be found to contain only 60 c.p.s. and 1000 c.p.s. The possible intermodulation distortion components are the frequencies 1060 and 940 c.p.s., and either of these frequencies must be isolated from the input frequencies, and measured for amplitude, in order to measure intermodulation distortion. This may be accomplished by means of instruments presently available, but the process of measurement is relatively complex, and a large number of adjustments of the instruments involved are required. Where the input frequencies are to be subject to variation over a wide range, the required measurements become extremely time-consuming.

In accordance with the present invention two frequencies are applied to the input of an amplifier under test. In a first embodiment of the invention one of these frequencies, $f_1$, may be fixed, and may be for example 60 c.p.s. The other frequency, $f_2$, may be variable over a wide range. The output of the amplifier is applied to one input circuit of a balanced modulator, and the variable frequency, $f_2$, is applied to the other input circuit of the balanced modulator. Assuming that the balanced modulator is completely balanced either input frequency alone, applied thereto, will result in no output therefrom. To the output of the modulator is connected an amplifier, which is tuned to a single frequency, $f_1$, i.e., the fixed frequency applied to the input of the amplifier, or in the specific example given, 60 c.p.s. If now the output of the amplifier contains no intermodulation components, there will be applied to the input of the balanced modulator the first input frequency, $f_1$, which will produce no output component of itself, the second input frequency, $f_2$, which will produce no output component of itself, and the sum and difference of the two input frequencies, neither of which will be capable of passage by the tuned amplifier since neither one is 60 c.p.s. If, however, an intermodulation component, $f_1 \pm f_2$, does appear at the output of the amplifier and is applied to the first input circuit of the balanced modulator, this intermodulation component will combine with the frequency of the second oscillator, $f_2$, to produce $f_1$, i.e., 60 c.p.s. This will be true regardless of the frequency of the second oscillator. Accordingly, the second oscillator can be tuned to any desired frequency and intermodulation distortion for that frequency readily determined. The output of the tuned amplifier may be detected and applied to a meter, or may be indicated in any other convenient fashion.

In accordance with the second embodiment of the invention, both the first and second oscillators may be tunable, in which case the filter at the output of the balanced mixer must also be tunable over the range of the first oscillator. In order to conduct the test, the first oscillator and the output filter of the balanced mixer must be correspondingly tuned. Having set the values of the one oscillator and of the output filter, the other oscillator may be tuned at will to any frequency, and intermodulation distortion will be automatically measured for the combination of frequencies.

In accordance with still a further modification of the invention, the variable oscillator of the first embodiment may be automatically tuned over a range by means of a reactance tuner and sawtooth generator. The output of the latter may be applied to the horizontal deflection electrodes of a cathode ray tube indicator, and the vertical deflection electrodes may be connected to the output of the filter of the detector of the first embodiment, which then acts in place of the meter otherwise employed. In this way, a continuous plot may be made visible of intermodulation distortion as a function of one of the frequencies being applied to the amplifier input circuit.

It is accordingly an object of the present invention to provide a novel system for measuring intermodulation distortion.

It is a further object of the invention to provide a novel system for measuring intermodulation distortion in which two frequencies may be applied to an amplifier or other translating device being tested for intermodulation distortion, one of the oscillators being capable of continuous frequency variation without requiring any resetting of the measuring system to compensate for this variation of frequency.

It is a further object of the invention to provide a system for readily measuring intermodulation distortion for any pair of frequencies input to a device being tested.

Still another object of the invention resides in the provision of a system for plotting intermodulation distortion of an amplifier or other translating device subject to test as a function of frequency, and more particularly for providing a continuous plot of intermodulation distortion as a function of frequency.

The above and still further features, objects and advantages of the present invention will become apparent upon consideration of the following detailed description of various embodiments thereof, especially when taken in conjunction with the accompanying drawings, wherein:

Figure 2 is a modification of the system of Figure 1 which permits variation of two frequencies applied to the input of a device being tested; and Figure 3 is a block diagram of a system for plotting intermodulation distortion as a function of frequency.

Figure 1:
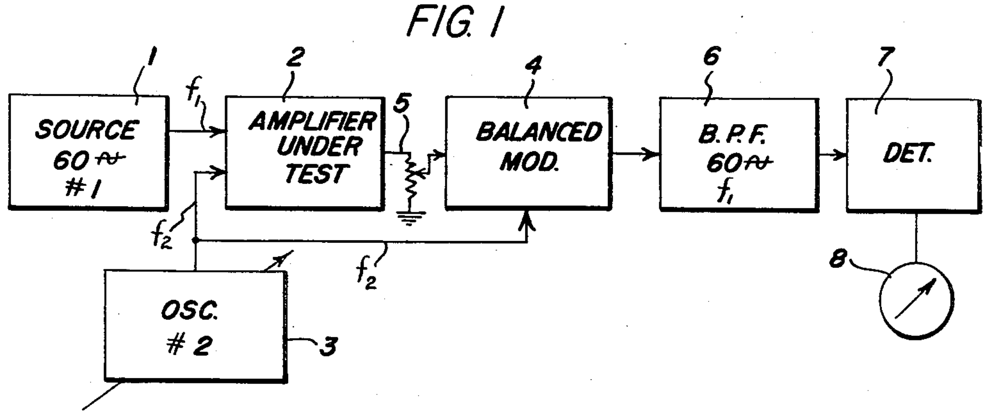
Figure 1 is a block diagram of a simple modulation distortion measuring device in accordance with the invention.
Figure 1:
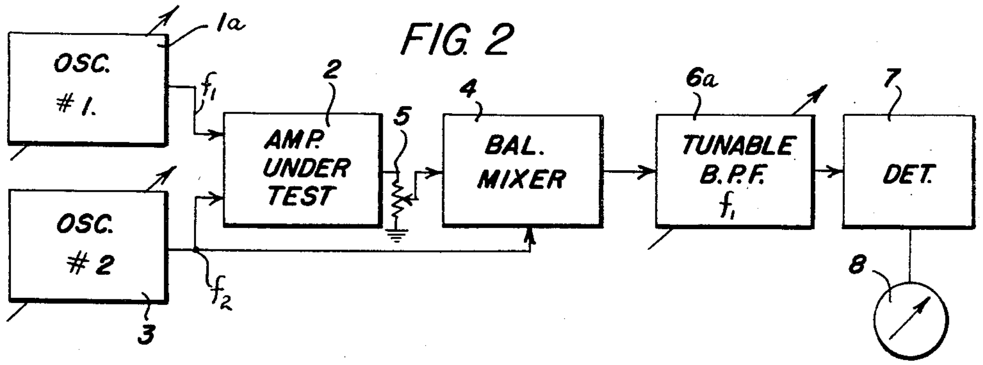
Figure 1:
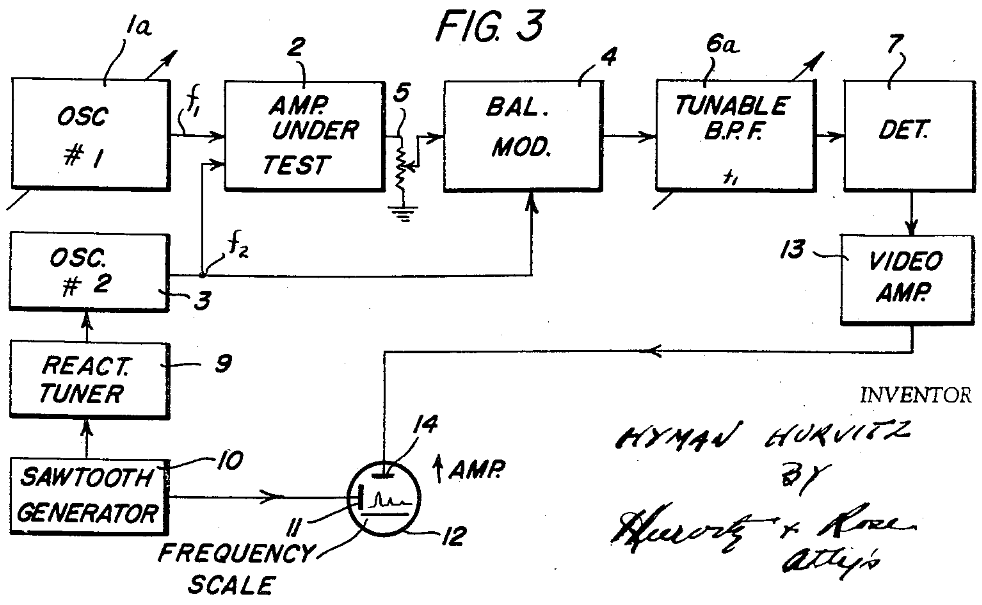

Referring now more particularly to Figure 1 of the accompanying drawings, the reference numeral 1 denotes a first source of signal, which may be an oscillator if desired, the output of which is applied to the input circuit of an amplifier under test, identified by the reference numeral 2. Simultaneously, the output of a second tunable oscillator 3 is applied to the input circuit of the amplifier under test, 2. The output of the amplifier is applied to one input circuit of a balanced modulator 4, and the output of the oscillator 3 is applied to the other input circuit of the balanced modulator 4. The output of the amplifier 2 may be applied to the balanced modulator 4 via an attenuator network 5 if desired, so that the relative amplitudes to the input signals to the balanced oscillator 4 shall be of appropriate magnitudes, i.e., approximately equal, although this is not essential. The attenuator 5 may be approximately calibrated if desired so that for a given amplifier output, a known value of signal may be applied to the balanced modulator 4. Connected to the output circuit of the balanced modulator 4 is a band-pass amplifier or filter 6, tuned to the frequency of the source 1 and which may have an extremely narrow pass-band. The output of the band-pass filter or amplifier 6 is connected to a conventionad detector 7, at the output of which may be connected a meter 8. If desired, amplification may be provided between the detector 7 and the meter 8, and intermediate the oscillator 3 in the balanced modulator 4.

In operation, and assuming balance of the balanced modulator 4, no output will be available from the balanced modulator 4 unless modulation distortion occurs in the amplifier under test 2. Assuming the frequency of the source 1 to be $f_1$ and the frequencv of the oscillator 3 to be $f_2$, the true output frequency of the amplifier 2 will be $f_1$, $f_2$, and the intermodulation components will be $f_2+f_1$ and $f_2-f_1$, assuming first order intermodulation components only to exist. If no intermodulation components exist the output of the balanced modulator will consist of the frequencies $f_2+f_1$, $f_2-f_1$, $f_2+f_2$ and $f_1+f_1$, the latter two frequencies being harmonic components. None of these frequencies falls within the pass-band of the filter 6. If on the other hand, intermodulation components exist at the output of the amplifier 2, these will have frequencies $f_2-f_1$ and $f_2+f_1$. Either of these frequencies combined with frequency $f_2$ gives a difference frequency of $f_1$, which is passed by the band-pass circuit 6, and indicated by the meter 8. Accordingly, the indication of the meter represents intermodulation components only, and the meter 8 may be calibrated in terms of percentae intermodulation for any standard setting of output of the amplifier under test, 2.

Variation of the frequency of the oscillator 3 obviously does not affect the operation of the system of Figure 1.

Referring now more specifically to Figure 2 of the accompanying drawings, the oscillator 1 of Figure 1 is replaced by a tunable oscillator 1*a*. The band-pass amplifier 6 is replaced by a tunable amplifier 6*a*, so that the frequency of the tunable amplifier 6*a* may be caused to correspond to the frequency of the oscillator 1*a* for any setting of the latter. The system then works precisely as in the case of the system of Figure 1.

The system of Figure 3 follows generally the system of Figure 2 except in that oscillator 3 is tuned periodically over a determined range by means of a reactance tube tuner 9, which is in turn driven by a sawtooth generator 10. The output of the sawtooth generator 10 is applied not only to the reactance tube 9 but also the horizontal deflection electrodes 11 of the cathode ray tube indicator 12. The output of the detector 7 is applied to the video amplifier 13, the output of which is then applied to the vertical deflection electrodes 14 of cathode ray tube indicator 12. Since the frequency of the oscillator 3 does not affect the operation of the system, in respect to producing the video signal output for application to the vertical deflection of the electrode 14, and since the horizontal position of the beam of the cathode ray tube indicator 12 varies as a function of the frequency of oscillator 3 at each instant of time, there is generated on the base of the cathode ray tube indicator 12 a plot of intermodulation distortion as ordinates, against frequencies as abscissae.

While I have described and illustrated various specific and preferred embodiments of the present invention, as required by the statutes pertaining to Letters Patent of the United States, it will be understood that variations and modifications of my invention may be resorted to without departing from the true spirit and scope of the invention as defined in the appended claims.

What I claim is:

1. A system for measuring intermodulation distortion generated by a translating device, said translating device having an input circuit and an output circuit, comprising a source of signal of frequency $f_1$ coupled to said input circuit, a source of signal of frequency $f_2$ coupled to said input circuit, a balanced mixer having plural input circuits and an output circut, means coupling the output circuit of said translating device to one of said input circuits of said balanced mixer, means coupling said source of signal of frequency $f_2$ to another of said input circuits of said balanced mixer, a pass-band filter tuned to the frequency $f_1$, means coupling said pass-band filter in cascade with the output circuit of said balanced mixer, and means for indicating the amplitude of output signal representing intermodulation distortion derived from said pass-band filter.

2. The combination according to claim 1, wherein said source of frequency $f_2$ is frequency variable.

3. The combination according to claim 1, wherein said source of frequency $f_1$ and said source of frequency $f_2$ are both frequency variable, and wherein the pass frequency of said narrow band-pass filter includes said frequency $f_1$ for all values of said frequency $f_1$ within the range of said source of frequency $f_1$.

4. The combination according to claim 1, wherein is provided means for tuning the frequency of said source of signal of frequency $f_1$ over a range of values, a visual indicator having means for generating an image, means for continuously deflecting said image in a first coordinate direction as a function of the frequency $f_1$, and means for deflecting said image in a second coordinate direction in response to said output signal derived from said pass-band filter.

5. The combination according to claim 1, wherein is provided a reactance tuner coupled to said oscillator of frequency $f_2$, a source of sawtooth modulating voltage coupled to said reactance tuner, a cathode ray tube indicator having means for generating a cathode ray beam and first and second beam deflection elements, means coupling said first deflection elements to said source of sawtooth modulating voltage for deflecting said beam in a first direction, and means coupling said output signal to the other of said beam deflection elements for deflecting said beam in a second direction.

6. A system for measuring intermodulation distortion generated by a signal translating device, comprising means for applying two signals of distinct frequencies to said translating device for translation thereby, means for heterodyning the output of said signal translating device with one of said two signals, and means for detecting the amplitude of only intermodulation distortion representative signal at the other of said two frequencies present at the output of said means for heterodyning.

7. The combination according to claim 6, wherein said means for heterodyning is a balanced mixer.

8. A system for measuring intermodulation distortion generated by a translating device, said translating device having an input circuit and generating an output, comprising a source of signal of frequency $f_1$ coupled to said input circuit, a source of signal of frequency $f_2$ coupled to said input circuit, a heterodyne mixer having an input circuit and an output circuit, means coupling the output of said translating device to said input circuit of said mixer, means coupling said source of signal of frequency $f_2$ to said input circuit of said mixer, means for selecting intermodulation distortion representative signal of frequency $f_1$ from said output circuit of said mixer to the exclusion of other products of conversion, and means for indicating the amplitude of the selected signal.

References Cited in the file of this patent

UNITED STATES PATENTS

| | | |
|---|---|---|
| 2,143,094 | Swift | May 29, 1937 |
| 2,432,214 | Sontheimer | Dec. 9, 1947 |
| 2,499,001 | Green | Feb. 28, 1950 |
| 2,530,596 | Blok | Nov. 21, 1950 |

OTHER REFERENCES

Avins: Audio Engineering "Intermodulation and Harmonic Distortion Meas." October 1948, pp. 17–18.

Van Beuren: "Intermodulation Meas." Audio Engr. November 1950, pp. 24, 25, 56–58.

Terman: "Electronic Meas." Second edition, pp. 335–340.

Scroggie: Wireless World, "Inexpensive Wave Analyzer," August 1955, pp. 360–365.

Feldman: Tele-Tech and Electronic Industries, "Audio Freq. Spectrum Analyzer," October 1955, pp. 78–81, 133–135.